United States Patent [19]

Stitt

[11] Patent Number: 4,547,001

[45] Date of Patent: Oct. 15, 1985

[54] PRESSURE SENSITIVE LABEL WITH SURFACE CONFORMING LOBES

[75] Inventor: Edward M. Stitt, Burbank, Calif.

[73] Assignee: Sam Allenberg, Burbank, Calif.

[21] Appl. No.: 533,107

[22] Filed: Sep. 19, 1983

[51] Int. Cl.[4] .......... B42D 15/00; B32B 3/10

[52] U.S. Cl. .......... 283/81; 283/101; 283/105; 428/343; 428/916

[58] Field of Search .......... 283/71, 78, 79, 80, 283/81, 101, 105; 428/343, 916

[56] References Cited

U.S. PATENT DOCUMENTS

| | | | |
|---|---|---|---|
| 175,242 | 3/1876 | Fletcher | 283/101 |
| 385,158 | 6/1886 | Woodhull | 283/101 |
| 1,089,986 | 3/1914 | Thom | 283/101 |
| 3,500,364 | 3/1970 | David et al. | 283/101 |
| 4,149,738 | 4/1979 | Illos et al. | 283/101 |
| 4,159,129 | 6/1979 | Lockhart | 282/28 R |
| 4,246,307 | 1/1981 | Trautwein | 283/101 |
| 4,320,158 | 3/1982 | Seeley | 428/343 |

*Primary Examiner*—Paul A. Bell

*Attorney, Agent, or Firm*—Marvin H. Kleinberg

[57] ABSTRACT

A pressure sensitive label is disclosed which is specially adapted to be used with nonplanar objects such as fruit and vegetables. The label, which may be generally circular or elliptical includes a plurality of radial slits which creates a plurality of relatively independent tabs which can conform to curved or irregular surfaces. The tabs may terminate in arcuate lobes to assure better attachment.

8 Claims, 3 Drawing Figures

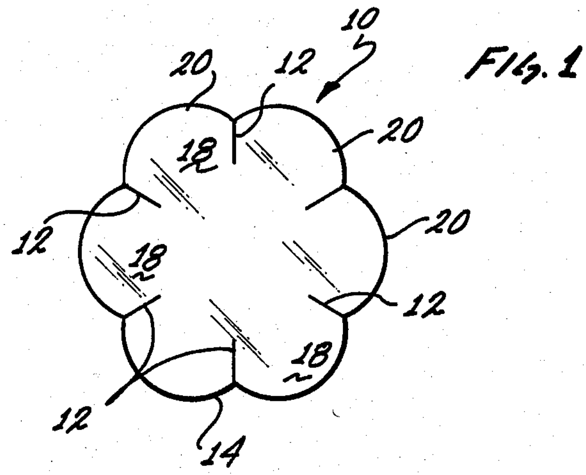
Fig. 1
Fig. 2
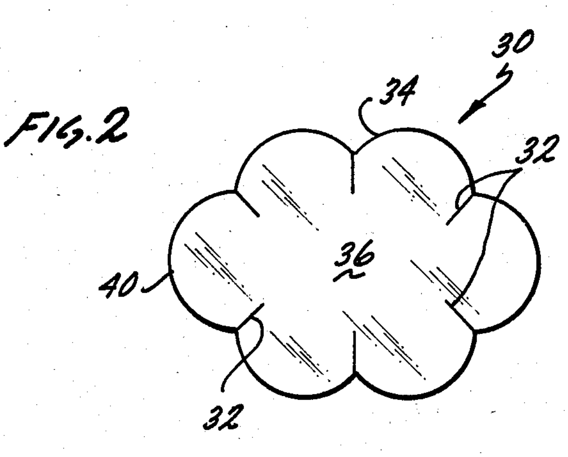
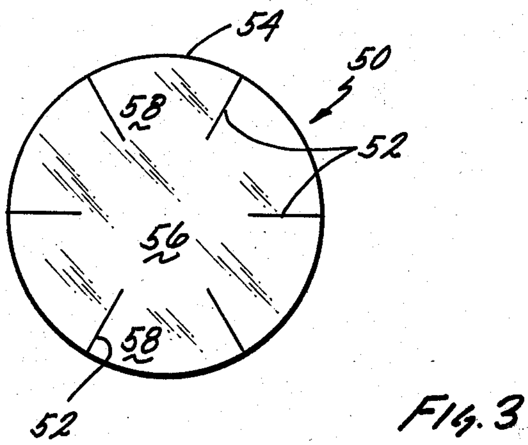
Fig. 3

PRESSURE SENSITIVE LABEL WITH SURFACE CONFORMING LOBES

The present invention relates to pressure sensitive labels and more particularly, a label adapted to conform to irregularly shaped surfaces that may include texturing or protuburances.

For many years, growers and packers of produce have sought to apply distinctive labels to their goods to either identify the source or to act as a grade or type identifier. For example, a shipper of fruit might wish to apply labels identifying the brand under which it is marketed or the quality of the fruit or the variety.

Generally, when using the conventional pressure sensitive labels of the prior art, the label is generally made from a planar sheet and if applied to a nonplanar surface or a surface with irregularities, the label tends to develop folds or creases and does not have a neat appearance. For surfaces that include irregularities as well as curves, there may be a problem in adhering the label because of the planar nature of the label and the nonplanar surface to which it must adhere.

There have been shown in prior art, labels that resist tampering by being easily destroyed. Such labels include cuts or slits which leave regions of local weakness such that if removal is attempted, the label tears or is otherwise destroyed. Such labels are frequently used as revenue stamps or as price labels to prevent lower priced labels from being removed and placed on higher priced goods.

In the prior art, there have been shown stamps and labels that included internal weaknesses to prevent the stamps or labels from being removed and fraudulently reused. Typical of such early inventions are the patents to A. C. Fletcher, No. 175,242, patented Mar. 28, 1876 and to W. W. Bierce, No. 194,212, patented Aug. 14, 1877. More recently, patents to Huber, No. 2,845,728, patented Aug. 5, 1958 and to Kaplan, No. 3,221,427, patented Dec. 7, 1965, are more illustrative of the modern trend in self destroying pressure sensitive labels. Huber teaches a substantially rectangular label which has been weakened by rolls of incisions or perforations arranged longitudinally of the labels. Alternatively, partial incisions can be utilized which do not completely separate adjacent areas of the label.

The patent to Kaplan utilizes a weakening in a generally undulating form, exhibited as a zig zag cut. Alternatively, a continuous undulating curved cut can be employed. The Kaplan labels were believed to be more easily destroyed when attempts were made to remove them.

A shortcoming of prior art labels has been noticeable when attempting to affix labels to other than a planar or cylindrical surface. Should it be necessary or desirable to apply such a label to a convex or otherwise irregular surface, conventional labels become "wrinkled" and do not adhere properly. Further, if the surface is uneven or irregular, the label may not fully conform to the surface and automatic labeling machinery may encounter difficulties.

In recent years, it has been deemed desirable to apply distinctive labels to various curved and irregularly shaped objects such as fresh fruit and vegetables which are to be uniquely identified. Some growers of premium quality produce have undertaken to establish trademark or brand identification for their goods and have deemed it desirable to affix a recognizable label to the individual items to distinguish them from the product of competitors.

Special labels are used to identify source, as well as grade or quality. It has been deemed desirable to apply labels to such varied items as citrus fruit, apples, pears, avocados, kiwi and even onions. Some growers and packers believe the extra expense is justified to assure that the consumer acquires their product when requested, preventing substitutions of produce of other growers which may not be of the same quality.

Similarly, merchants selling several varieties or grades of otherwise indistinguishable fruit may rely upon a label to identify a more expensive variety of a particular fruit. Such labeling simplifies the selection and checkout process in that a grocery clerk can quickly determine whether apples being purchased are the more costly variety of those available for sale.

Conventional adhesive labels do not readily adhere to the irregularly shaped or curved surfaces of fruit and vegetables. What has been desired is a label that is easily applied and which readily adheres to curved and otherwise irregular surfaces. According to the present invention, a pressure sensitive adhesive label is provided with a series of radial slits which result in a plurality of relatively independent radial tabs. These tabs permit the label to conform to a curved or irregular surface.

In a preferred embodiment, each tab terminates in a lobe which enhances the conformation of the label to a surface. Both round and elliptical labels can be utilized, depending upon the preference of the user and the imprinting, if any, which may be required on the label.

Other oval shapes may be adapted to the present invention by providing a plurality of radial slits to create relatively independent peripheral tabs. The tabs may or may not be terminated in lobes.

The novel features which are believed to be characteristic of the invention, both as to organization and method of operation, together with further objects and advantages thereof will be better understood from the following description, considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 1 is a top view of a circular label according to the present invention, including a plurality of lobes extending from radial tabs;

FIG. 2 is a top view of an alternative embodiment of the invention in which an oval label is provided with a plurality of radial tabs terminating in lobes; and FIG. 3 is a top view of an alternative embodiment of a circular label employing radial tabs without lobes.

Turning first to FIG. 1, there is shown a pressure sensitive label 10 which can be fabricated from a pliable or flexible sheet member using conventional methods and techniques. The label 10 has cut therein a plurality of radial slits 12 which extend from the peripheral edge 14 toward the center 16 of the label. Each slit 12 is sufficiently short to as not to threaten the structural integrity of the label 10.

The slits 12 define a plurality of tabs 18 which, in the preferred embodiment terminate in a plurality of peripheral lobes 20. As shown in FIG. 1, the lobes are arcuate and impart a scalloped appearance to the label 10.

FIG. 2, there is shown an alternative embodiment of the present invention in which the label 30 takes basically an oval shape. As in the embodiments of FIG. 1, the label 30 has a plurality of radial slits 32 which extend from the peripheral edge 34 toward the center 36. The slits 32 define a plurality of radially extending tabs 38 which, as in the embodiment of FIG. 1 terminate in an arc on circular lobes 40.

FIG. 3 is an alternative embodiment of a label 50 according to the present invention. The label 50 includes radial slits 52 extending from the peripheral edge 54 toward the center 56, thereby defining a plurality of tabs 58. In this embodiment, however, the periphery 54 defines the edge of the label and no lobe is provided extending beyond the periphery of the circle.

In use, the several embodiments are employed in substantially the same fashion. An item of produce, for example, a grapefruit having a convexly curved surface has applied to it a pressure sensitive adhesive label according to one of the embodiments. The individual tabs move relatively independently and conform to the surface of the grapefruit without wrinkling.

This ability to conform to virtually any surface is especially useful should the article have surface irregularities such as bumps or dips which would not otherwise be accommodated by a normal, planar label that lacks the flexible and relatively independent tabs or fingers of the present invention.

The label of the present invention inherently conforms without wrinkling to a convex or otherwise irregular surface to which it is applied. Each tab may move in three dimensions as necessary relative to the adjacent tabs. That is, a particular tab may not be in the same plane as the immediately adjacent tabs, and it may occupy a radially shortened span relative to the adjacent tabs. Also, the adjacent edges of two adjacent tabs may experience a relative movement in the circumferential direction so that the space between them is widened, or they overlap.

Labels, according to the present invention, can also be applied to onions, avocados, peaches, apples, and other items of produce whose price, origin, or variety are to be uniquely identified to the prospective buyer or clerks or cashiers.

The use of identifying labels according to the present invention reduces instances of confusion with respect to various grades of produce or the goods of a regional producer. Certain geographical areas of the county have become famous for the quality of their produce. Labeling would enable such produce to be uniquely identified to the consuming public and to the vendor's personnel, as well.

An incidental benefit of the provision of relatively independent tabs or fingers on a label can be, if the adhesive bond between the label and the product to which it is adhered exceeds the structural strength of the label, destruction of the label would be facilitated should an attempt be made to remove it. It is noted that the self destroying labels of the prior art are usually provided with internal weakened sections or with cuts that are substantially rectilinear and extend alternatively from opposite edges.

Thus there has been described and shown an improved pressure sensitive label specifically adapted for use with objects having curved or irregular surfaces. A plurality of substantially independent peripheral tabs tends to conform to the surface to which the label is applied. It will be apparent to those skilled in the art that within the scope of the present invention modifications and alterations are possible without departure from the concepts taught herein. Accordingly, the scope of the invention should be limited only by the claims appended hereto.

What is claimed as new is:

1. A label adapted to be applied without wrinkling to a surface of convex or otherwise irregular shape such as the surface of an item of fruit, comprising:

a flat flexible sheet member of generally oval configuration having a pressure sensitive adhesive material on its under side;

said sheet member having a series of radial slits formed therein around the entire circumference of said member and forming, between adjacent slits, a corresponding series of relatively independent, radially extending tabs;

whereby when said sheet member is applied to a convex or otherwise irregular surface, each one of said tabs may move in three dimensions relative to the adjacent tabs as may be necessary for said sheet member to conform to the surface without wrinkling.

2. A label as in claim 1 wherein there are six of said slits and six of said tabs.

3. A label as in claim 1 wherein said tabs are elongated and rounded on their outer ends to form lobes.

4. A label as in claim 1 wherein said sheet member is of substantially elliptical configuration.

5. A label as in claim 4 wherein said tabs are elongated and rounded on their outer ends for form lobes.

6. A label as in claim 1 wherein said sheet member is of substantially circular configuration.

7. A label as in claim 6 wherein said tabs are elongated and rounded on their ends to form lobes.

8. A label as claim 1 wherein said adhesive material is capable of creating a bond which exceeds the structural strength of the sheet member.

* * * * *